(12) United States Patent
Matthey et al.

(10) Patent No.: US 10,940,906 B2
(45) Date of Patent: Mar. 9, 2021

(54) PORTABLE ACTIVE LIGHTING DEVICE OR SAME INSTALLED ON A BICYCLE

(71) Applicant: The Swatch Group Research and Development Ltd, Marin (CH)

(72) Inventors: Olivier Matthey, Mauborget (CH); Michel Willemin, Preles (CH); Bruno Scagliarini, Vallamand (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 16/545,208

(22) Filed: Aug. 20, 2019

(65) Prior Publication Data
US 2020/0070915 A1    Mar. 5, 2020

(30) Foreign Application Priority Data

Aug. 28, 2018 (EP) .................................... 18191097

(51) Int. Cl.
*B62J 6/00* (2020.01)
*B62J 6/01* (2020.01)
(Continued)

(52) U.S. Cl.
CPC ............... *B62J 6/01* (2020.02); *B62J 6/02* (2013.01); *B62J 6/165* (2020.02)

(58) Field of Classification Search
CPC ..... B62J 6/02; B62J 6/015; B62J 6/024; B62J 45/412; B60Q 1/1423; B60Q 1/04; B60Q 2300/112
See application file for complete search history.

(56) References Cited

U.S. PATENT DOCUMENTS 5,798,911 A * 8/1998 Josic ................. B60Q 1/085
                                                          362/466
6,587,573 B1   7/2003 Stam et al.
(Continued)

FOREIGN PATENT DOCUMENTS

CN         202593696 U    12/2012
CN         105757572 A     7/2016
(Continued)

OTHER PUBLICATIONS

European Search Report dated Feb. 25, 2019 in European Application 18191097.7 filed on Aug. 28, 2018 (with English Translation of Categories of Cited Documents).
(Continued)

*Primary Examiner* — Hongmin Fan
(74) *Attorney, Agent, or Firm* — Oblon, McClelland, Maier & Neustadt, L.L.P.

(57) ABSTRACT

The active lighting device of a bicycle includes a first optical system with a first light source for long-distance illumination, controlled by a control unit, and a second optical system with a second light source for short-distance illumination, controlled by the control unit. It includes a light sensor for determining the light intensity of a location in which the bicycle is situated and allows the control unit to adapt the light intensity of the light sources, if they are activated and if the ambient light intensity is below a determined light threshold. Moreover, a speed sensor is provided for determining the speed of the bicycle in use on a path, so that the control unit controls the activation of the first light source from at least one determined speed threshold. An orientation detector is provided for orienting the light sources depending on a curve travelled by the bicycle in use.

13 Claims, 4 Drawing Sheets

(51) Int. Cl.
 *B62J 6/02* (2020.01)
 *B62J 6/165* (2020.01)

(56) References Cited

U.S. PATENT DOCUMENTS

| | | | |
|---|---|---|---|
| 2001/0012206 A1 | 8/2001 | Hayami et al. | |
| 2003/0123705 A1 | 7/2003 | Stam et al. | |
| 2003/0123706 A1 | 7/2003 | Stam et al. | |
| 2004/0105273 A1* | 6/2004 | Takeda | B62J 6/015 362/473 |
| 2005/0180150 A1* | 8/2005 | Okada | B62J 99/00 362/473 |
| 2006/0018511 A1 | 1/2006 | Stam et al. | |
| 2008/0129206 A1 | 6/2008 | Stam et al. | |
| 2013/0320193 A1 | 12/2013 | Liken et al. | |
| 2016/0001836 A1* | 1/2016 | Lee | B62J 6/02 362/475 |
| 2016/0185276 A1 | 6/2016 | Tanaka et al. | |
| 2017/0190371 A1* | 7/2017 | Su | A61B 5/0205 |
| 2018/0162472 A1* | 6/2018 | Gherezghiher | B62J 6/16 |
| 2019/0359119 A1 | 11/2019 | Brouillard-Turgeon | |

FOREIGN PATENT DOCUMENTS

| | | |
|---|---|---|
| CN | 205716835 U | 11/2016 |
| DE | 10 2015 225 890 A1 | 6/2016 |
| EP | 2 420 408 A1 | 2/2012 |
| EP | 2 676 839 A1 | 12/2013 |
| GB | 2 358 914 A | 8/2001 |
| JP | 2-121009 A | 5/1990 |
| JP | 7-81647 A | 3/1995 |
| JP | 2007-145233 A | 6/2007 |
| JP | 2007-320487 A | 12/2007 |
| JP | 2011-201382 A | 10/2011 |
| JP | 2017-222244 A | 12/2017 |
| JP | 2018-62260 A | 4/2018 |
| WO | WO 2013/181307 A1 | 12/2013 |
| WO | WO 2018/112656 A1 | 6/2018 |

OTHER PUBLICATIONS

Office Action dated Sep. 8, 2020 in corresponding Japanese Patent Application No. 2019-148340 (with English Translation), 18 pages.
Combined Chinese Office Action and Search Report dated Sep. 25, 2020 in corresponding Chinese Patent Application No. 201910781602.8 (with English Translation and English Translation of Category of Cited Documents), 24 pages.
European Search Report dated Jan. 17, 2020 in European Patent Application No. 19184419, 2 pages.

* cited by examiner

PORTABLE ACTIVE LIGHTING DEVICE OR SAME INSTALLED ON A BICYCLE

CROSS REFERENCE TO RELATED APPLICATION

This application claims priority to European Patent Application No. 18191097.7, filed Aug. 28, 2018, the entire contents of which are incorporated herein by reference.

TECHNICAL FIELD OF THE INVENTION

The invention relates to a portable active lighting device or such a device installed on a vehicle having at least one wheel, such as a bicycle. Preferably, each lighting device has a first optical system having at least one first light source, and a second optical system having at least one second light source, which are partially placed on the vehicle.

PRIOR ART

A known manner of suitably illuminating a path or road travelled by a vehicle involves using a lighting device with an adaptable configuration of the intensity of the light generated by lamps or other light sources. Such a lighting device can also be adapted so as to orient the light beam as a function of the corners to be turned in the dark or so as not to dazzle a driver of an oncoming vehicle on the road.

Patent application WO 2017/023293 A1 discloses an intelligent lighting system for a two-wheeled vehicle such as a bicycle. It comprises an arrangement of light-emitting diodes or LEDs, which can be independently selected to define a desired light intensity. Motors are also provided so as to orient the light according to the height or inclination of the bicycle, as well as motion or light intensity sensors, and a light arrangement as a function of the bicycle's speed. However, all LEDs are oriented at the same time by the motors and not independently from one another. Moreover, this document does not specify the orientation of each light beam emitted by the LEDs in order to adapt the radiation distance and intensity of each LED as a function of the speed or light intensity detected, which can constitute a drawback.

Patent application US 2018/0020528 A1 discloses a smart lighting system for a bicycle. A light arrangement can be provided on the front fork of the bicycle or also on the helmet of the cyclist. It comprises a motion sensor for detecting the acceleration and speed, and means for turning the light source as a function of a corner or the speed, as well as the movement of the cyclist's head such that the light beam remains aligned at all times with the cyclist's line of sight towards the road. However, it does not provide for orienting two light sources in different manners so as to light the road as a function of the speed or ambient light, which can constitute a drawback.

Patent document EP 3 036 149 B1 discloses a lighting device for a bicycle with a plurality of available LEDs. It also provides for a light sensor. A control element is provided to compare the acceleration, orientation and speed of the cyclist with reference data. A selection of the LEDs is also provided for, however again, this is not intended to orient at least two light sources in different manners in order to light the road travelled, which constitutes a drawback.

Patent document FR 2 844 759 B1 also discloses a motorbike headlight control system with gyrometer. Means are provided in order to orient the light, in particular as a function of the corners turned. However, it does not disclose the orientation of at least two light sources in different manners so as to illuminate the road travelled and taking into account the speed and light intensity detected, which constitutes a drawback.

SUMMARY OF THE INVENTION

The purpose of the invention is thus to overcome the aforementioned drawbacks so as to provide a portable active lighting device or such a device installed on a bicycle having at least two wheels that is easy to use and free of complications, so as to provide good illumination taking into account the speed or inclination of the bicycle.

For this purpose, the invention relates to a portable active lighting device or such a device installed on a bicycle having at least two wheels, which comprises the features of the independent claim 1 or 2.

Specific embodiments of the lighting device are defined in the dependent claims 3 to 23.

One advantage of the lighting device according to the invention lies in the fact that a light sensor of the device detects the ambient light intensity so as to activate the one or more light sources of the optical systems A and B if the ambient light intensity is below a determined light threshold. The light sources can be automatically activated by a control unit powered by a power voltage source, such as a battery.

Advantageously, the light intensity of the activated light sources is managed by the control unit in inverse proportion to the intensity of the ambient light.

Advantageously, the lighting device is equipped with a speed sensor in order to activate the light source of the optical system A only if a speed of the bicycle in use exceeds a determined speed threshold. The light source of the optical system B can be activated as soon as the ambient light intensity falls below the determined light threshold, and independently of the bicycle speed.

Advantageously, the lighting device can also be equipped with at least one orientation or inclination detector in order to orient the light sources as a function of a corner taken by the bicycle.

BRIEF DESCRIPTION OF THE FIGURES

The purposes, advantages and features of a portable active lighting device or of such a device installed on a bicycle having at least two wheels, will appear more clearly in the following description which is given on the basis of at least one non-limiting embodiment shown by way of the drawings, in which.

DETAILED DESCRIPTION OF THE INVENTION

In the following description, reference is made to a portable active lighting device or to such a device installed on a bicycle having at least two wheels. All of the electronic components that are well known to a person skilled in the art in this technical field are only described in simplified form.

Figure 1:
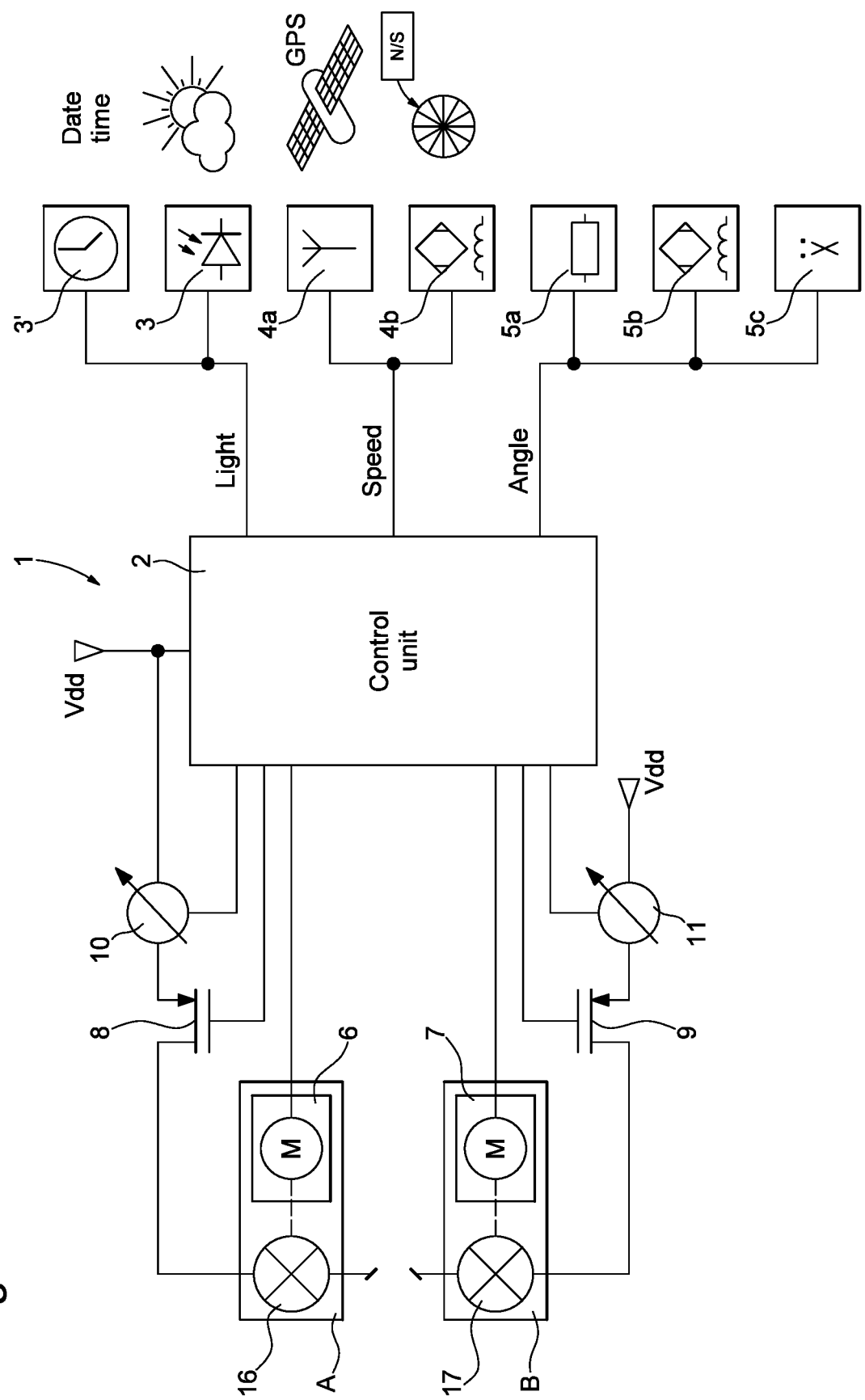
FIG. 1 shows a simplified block diagram of the components of the active lighting device according to the invention.

FIG. 1 shows, in a simplified manner, the different components of a portable active lighting device 1 or such a device installed on a bicycle having at least two wheels. The lighting device 1 mainly comprises two optical systems denoted A and B. The first optical system A comprises at least one first light source 16, whereas the second optical system B comprises at least one second light source 17. The first light source 16 is provided for long-distance illumination, preferably of variable intensity. The second light source 17 is provided for short-distance illumination, preferably of variable intensity.

Each light source 16, 17 is a light-emitting diode or a group of light-emitting diodes capable of being selected by a control unit 2 or capable of being activated all at the same time.

Generally speaking, each optical system A and B further comprises, in addition to the light sources 16, 17, an arrangement of lenses and mirrors, not shown, for providing a light beam, as well as a drive means 6, 7 formed by one or two electric motors, or even two pistons or two cylinders. In the scenario shown in FIG. 1, a first drive means 6 is illustrated, which forms a part of the first optical system A, and a second drive means 7 is illustrated, which forms a part of the second optical system B. Preferably, each drive means 6, 7 is controlled by a control unit 2 connected to a continuous power source Vdd. This electrical power source is preferably a DC voltage source originating from a rechargeable or primary battery, or which is extracted and rectified from received electromagnetic radiation.

Each drive means 6, 7 can affect the arrangement of lenses and mirrors of the optical system A or B, or directly affect each light source 16, 17 in order to orient the light beam generated by each activated light source. For example, in order to directly orient the light sources 16, 17 of the optical systems A, B, each drive means 6, 7 can comprise two motors. Thus, the light sources 16, 17 can be driven by each of the drive means 6, 7 controlled by the control unit 2, such that they rotate about two rotational axes X, Y perpendicular to one another. The light beam generated in each optical system A, B is oriented or directed in a direction Z perpendicular to the axes X, Y.

The lighting device 1 further comprises one or more sensors 3, 4a, 4b, 5a, 5b, 5c connected to the control unit 2 in order to allow each light source 16, 17 to be activated according to a measured parameter. Preferably, the control unit 2 powered by the DC voltage source Vdd is arranged, as soon as the bicycle is put in use, such that it automatically controls the lighting of the one or more light sources 16, 17 of the first and second optical systems A, B.

The control unit 2 can further comprise a low-frequency oscillator, which can be a MEMS or horological quartz oscillator, and at least one volatile or non-volatile memory. The volatile or non-volatile memory, not shown, is used to store measurements carried out by the one or more sensors and at least one calculation algorithm for managing and calculating the measurements carried out by the sensors 3, 4a, 4b, 5a, 5b, 5c. The control unit 2 can be a computing unit such as a processor or microcontroller for processing all of the signals received from the one or more measurement sensors.

The lighting device 1 mainly comprises a light intensity sensor or light sensor 3, which can be formed by a solar cell or a network of solar cells. From a luminosity threshold detected by the light intensity sensor 3, the control unit 2 activates at least the second light source 17 of the second optical system B for short-distance illumination. The light intensity threshold can directly depend on the ambient light surrounding the bicycle in use. Moreover, the light intensity of the activated second light source 17 is variable and inversely proportional to the change in ambient light intensity.

In a first alternative embodiment of the device 1, the lighting device 1 comprises at least one speed sensor 4a, 4b connected to the control unit 2. When the bicycle is in use, the speed sensor 4a, 4b determines the bicycle speed and, once a determined speed threshold is exceeded, activates the first light source 16 of the first optical system A. The first light source 16 generates light if the ambient light intensity detected by the light sensor 3 is below a determined light threshold. The second light source 17 of the second optical system B is activated independently of the bicycle calculated speed, i.e. as soon as the ambient light intensity detected by the light sensor 3 is below the determined light threshold.

The speed sensor can be a GPS receiver or equivalent 4a, or preferably a magnetic sensor 4b for detecting the passage of at least one permanent magnet positioned on a spoke or on the rim of one of the bicycle wheels. Each magnetic pulse from the passage of the permanent magnet in the vicinity of the magnetic sensor 4b, and according to a rate in time generated by the low-frequency oscillator, allows the control unit 2 to calculate the speed and the time at which the determined speed threshold is exceeded.

The lighting device 1 can further comprise or receive a calendar 3' of the dates and times (ephemeris dates and times) of each month of the year for a place of use of the device, on the basis whereof the ambient light is deemed insufficient. The control unit 2 can store this calendar 3' of the determined place of use of the device in memory in order to control the activation of the light sources 16, 17 of the optical systems A, B if, for example, the determined speed threshold is also exceeded. This determined speed threshold can be set at 15 km/h or 25 km/h, but can also be set to another value and stored in memory.

For this purpose, a first regulator 10 connected to the power voltage source Vdd is provided, which is connected to a first switch 8, which is itself connected to the first light source 16. The first switch 8 is controlled by the control unit 2 to activate the first light source 16 if the ambient light intensity is insufficient. A second regulator 11, which is connected to the power voltage source Vdd is provided and connected to a second switch 9, which is itself connected to the second light source 17 of the second optical system B. This second switch 9 is controlled by the control unit 2 to activate the second light source 17 if the ambient light intensity is insufficient.

The first and second switches 8, 9 are preferably MOS transistors, such as PMOS transistors as shown. However, NMOS transistors can also be considered. The source of the first PMOS transistor 8 is connected to the first regulator 10, whereas the source of the second PMOS transistor 9 is connected to the second regulator 11. The gate of the first PMOS transistor 8 is connected to the control unit 2 so that it is conducting upon activation of the first light source 16, or non-conducting so as not to activate the first light source 16. The gate of the second PMOS transistor 9 is connected to the control unit 2 so that it is conducting upon activation of the second light source 17, or non-conducting so as not to activate the second light source 17.

It should be noted that each regulator 10, 11 can be a current source, the current whereof intended to flow in each light source is variable and increases when the ambient light intensity falls below the determined light threshold. The variation in current of each regulator is directly controlled by the control unit 2.

In a second alternative embodiment of the device 1, the lighting device 1 comprises at least one orientation or inclination detector 5a, 5b, 5c connected to the control unit 2. When the bicycle is in use, the orientation or inclination detector 5a, 5b, 5c determines, for example, a curve travelled by the bicycle in use on a path or road. The orientation or inclination detector 5a, 5b, 5c provides an orientation signal to the control unit 2, which activates the first and second drive means 6, 7. These first and second drive means 6, 7 allow the one or more light beams generated by the one or more light sources 16, 17 of the first optical system A and/or of the second optical system B to be oriented depending on a curve travelled by the bicycle in use on a path or road. The orientation of the beams from the light sources 16, 17 is such that, when turning right, the light beams are oriented towards the right, and conversely when turning left.

In this second alternative embodiment, two light sources 16, 17 can be conceived, which are activated as soon as the ambient light intensity falls below a determined light threshold. However, another possibility involves activating only the second light source 17 if the speed detected by the speed sensor 4a, 4b does not exceed the determined speed threshold. Moreover, the first and second drive means 6, 7 can be designed to directly orient the first and second light sources 16, 17 of the optical systems A and B.

Figure 5A:
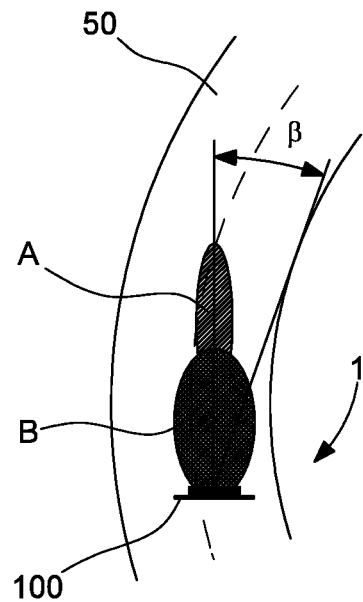
FIGS. 5a, 5b and 5c diagrammatically show a bicycle on a road or path taking a corner in order to orient the light sources of the optical systems A and B of the active lighting device according to the invention.
Figure 5B:
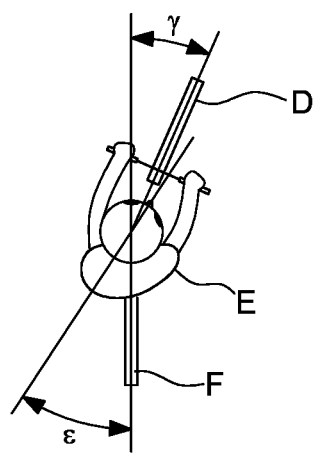
Figure 5C:
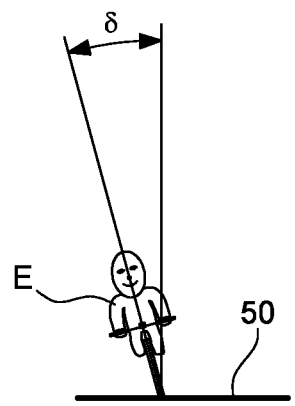

The orientation detector can be formed by a potentiometer 5a and/or a magnetometer 5b and/or an inclinometer 5c and/or an accelerometer 5c and/or a gyrometer 5c as explained hereafter with reference to FIGS. 5a to 5c.

Figure 2:
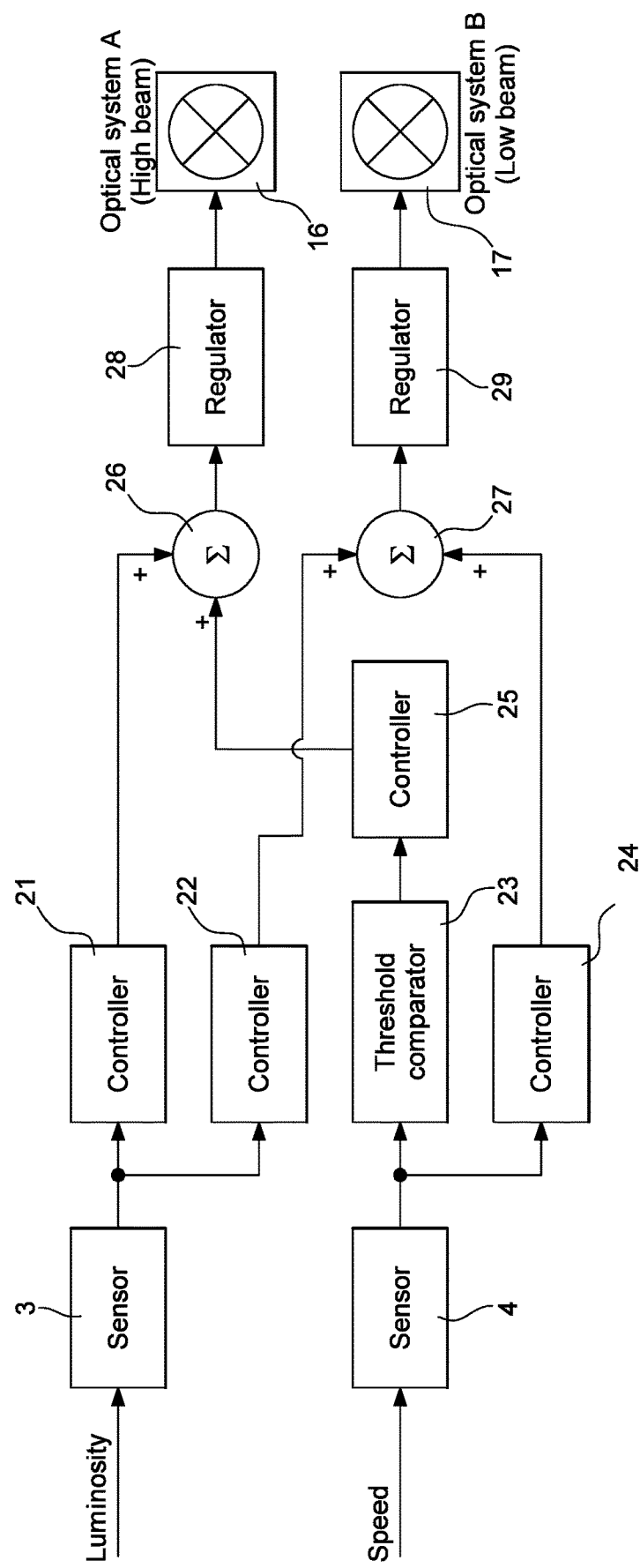
FIG. 2 shows a block diagram of one embodiment of the active lighting device for activating the light sources of the two optical systems A and B as a function of the bicycle speed on a road or path according to the invention.

FIG. 2 shows the first alternative embodiment of the active lighting device for activating the light sources 16, 17 of the two optical systems A and B as a function of the bicycle speed on a road or path according to the invention.

For simplicity purposes, the light sensor 3 is provided, which supplies a signal to a first controller 21 and to a second controller 22 of the control unit in a light intensity loop. The speed sensor 4 is also provided, which supplies a speed signal to a speed threshold comparator 23 and to a third controller 24 of the control unit. The comparator 23 supplies a comparison signal to a fourth controller 25 of the control unit. The comparison signal either takes a first state for controlling activation of the first light source 16 of the optical system A, or a second state for controlling non-activation of the first light source 16 of the optical system A. A first adder 26 is provided for adding the output signal of the first controller 21 and the output signal of the fourth controller 25, and a second adder 27 is provided for adding the output signal of the second controller 22 and the output signal of the third controller 24. The output signal of the first adder 26 controls a first regulator 28 for varying the light intensity of the first light source 16 of the first optical system A if activated. The output signal of the second adder 27 controls a second regulator 29 for varying the light intensity of the second light source 17 of the second optical system B which is always activated if the ambient light intensity is below a determined light threshold.

The light intensity of the first light source 16 is thus determined as the sum of the first controller 21 inversely proportional to the ambient light, and of the fourth controller 25 proportional to the speed of bicycle travel. However, the first light source 16 is only activated when a speed threshold determined by the user is exceeded, for example 25 km/h with hysteresis.

The light intensity of the second light source 17 is thus determined as the sum of the second controller 22 inversely proportional to the ambient light, and of the third controller 24 proportional to the speed of bicycle travel. In this scenario, the second light source 27 is always activated independently of the speed measured, if the ambient light intensity is below a determined light threshold.

It goes without saying that, when the bicycle is no longer in use, a manual switch can also be provided so as to deactivate the lighting device for all light sources. Said light sources can also be deactivated after a period of non-use of the bicycle, i.e. after a determined duration without motion, for example after 5 minutes.

Compared to that described with reference to FIG. 1, the regulators 28, 29 in FIG. 2 can be considered to be similar to those in FIG. 1. However each regulator can be connected to each light source 16, 17 by a respective switch controlled by the control unit.

Figure 3:
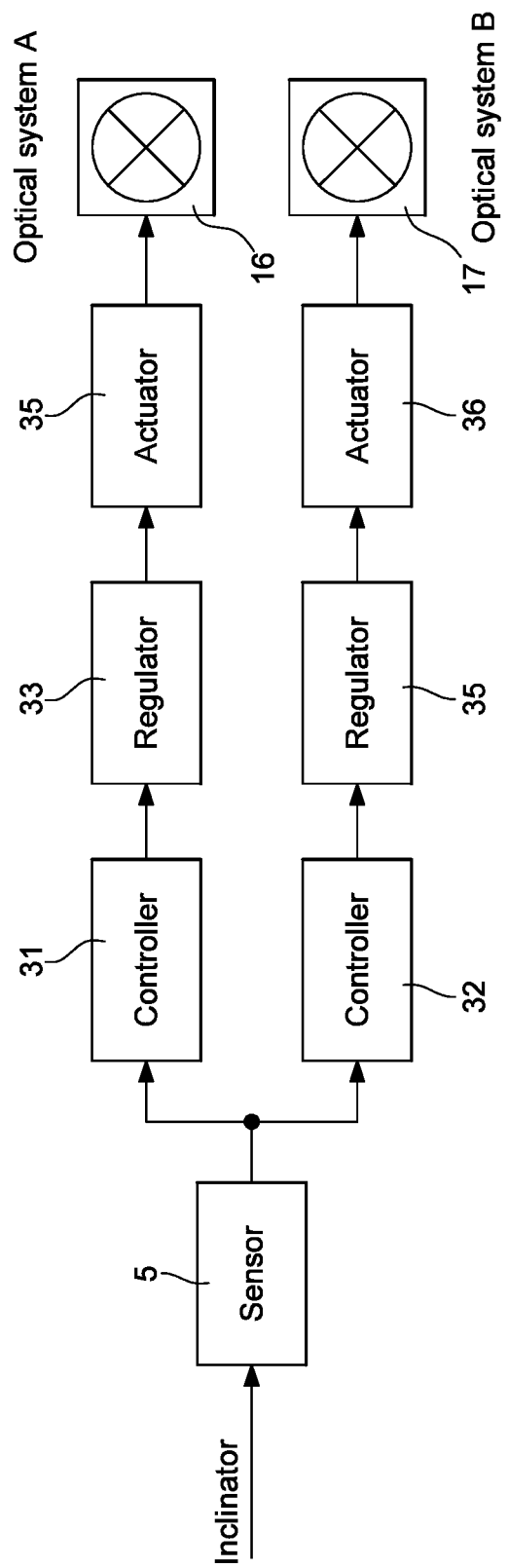
FIG. 3 shows a block diagram of another embodiment of the active lighting device for orienting the light sources of the optical systems A and B when a corner is taken on a road or path according to the invention.

FIG. 3 shows a second alternative embodiment of the active lighting device for orienting the light sources 16, 17 of the optical systems A and B when a corner is taken on a road or path according to the invention. It goes without saying that a detection of the ambient light by a light sensor is also provided for in parallel in order to vary the light intensity of the light sources 16, 17, which are activated, in inverse proportion to the ambient light intensity.

For simplicity purposes in this trajectory loop, at least one orientation or inclination detector 5 is provided, which supplies a signal to a first controller 31 and to a second controller 32. The first controller 31 supplies an output signal to a first variable-voltage regulator 33, and the second controller 32 supplies an output signal to a second variable-voltage regulator 34. The first variable-voltage regulator 33 controls a first actuator 35, which is at least one electric motor. This first actuator 35 receives control signals from the first regulator 33, such as pulse width modulation (PWM) signals in order to displace or orient, for example, the first light source 16 of the first optical system A. The second variable-voltage regulator 34 controls a second actuator 36, which is at least one electric motor. This second actuator 36 receives control signals from the second regulator 34, such as pulse width modulation (PWM) signals in order to displace or orient, for example, the second light source 17 of the second optical system B.

Figure 4:
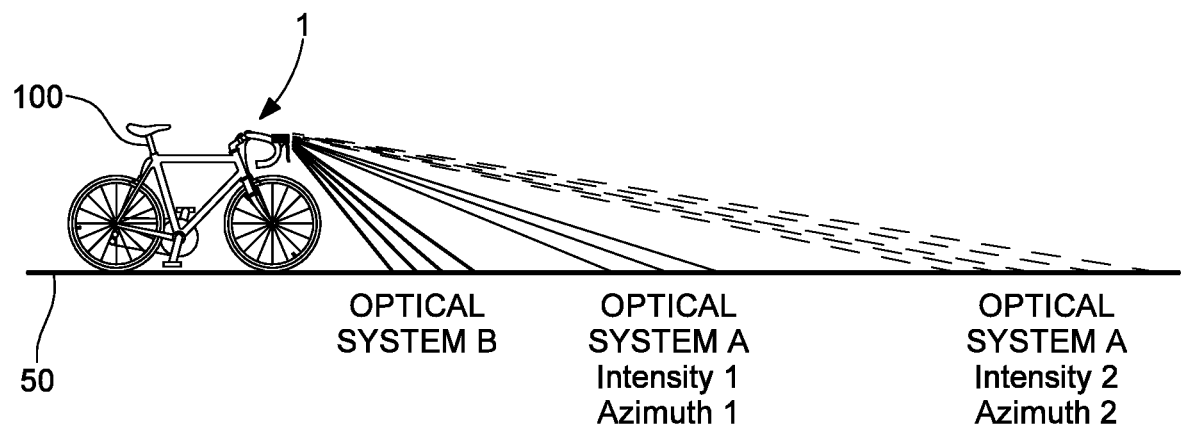
FIG. 4 diagrammatically illustrates a bicycle on a road or path with the activated light sources of the two optical systems A and B of the active lighting device, taking into account the light intensity and the speed measured in order to orient the light beam of the optical system A according to the invention.

FIG. 4 diagrammatically illustrates a bicycle 100 on a road 50 or path with the activated light sources of the two optical devices A and B of the active lighting device 1. The two light sources are activated if the bicycle speed exceeds a determined speed threshold and if the ambient light intensity is insufficient. If this is not the case, only the second light source of the optical system B is activated. Thus, the light intensity $I_{LUM}(v, I_{AMB})$ of the first light source of the optical system A depends on the speed v of the bicycle 100, and on the ambient light intensity $I_{AMB}$. The light intensity $I_{LUM}(I_{AMB})$ of the second light source of the optical system B only depends on the ambient light intensity $I_{AMB}$.

As shown in FIG. 4, it can also be provided that the greater the bicycle speed, the more the light intensity of the light beam from the first light source of the optical system A increases. Moreover, the first drive means of the optical system A orients said light source in order to illuminate further afield up to a vertical azimuth, which tends towards 0. The light intensity of each light source can vary in inverse proportion to the ambient light intensity, or even in steps.

FIGS. 5a, 5b and 5c diagrammatically show a bicycle 100 on a road 50 or path taking a corner in order to orient the light sources of the optical systems A and B of the active lighting device 1. Each optical system A, B can be mounted, for example, on a handlebar of the bicycle 100. The one or more orientation or inclination detectors are, for example, a magnetometer 5b or an inclinometer 5c or an accelerometer 5c or a gyrometer 5c or a potentiometer 5a or a combination of the aforementioned detectors.

The orientation or inclination detector can be mounted on a support, such as a helmet of the user E of the bicycle 100 and can supply an orientation signal by bidirectional wireless communication to the control unit positioned on the handlebar of the bicycle 100. This allows the orientation of the one or more light sources to be controlled by a head movement of the user E of the bicycle 100.

In FIG. 5a, the two light sources of the optical systems A and B of the lighting device 1 are activated and must be oriented by the drive means upon command by the control unit at an angle β as a function of the corner taken on the road 50.

In FIG. 5b, the control unit takes into account a rotational angle γ of the front wheel D of the bicycle as well as the angular movement ε of the head of the user E of the bicycle relative to the direction of the rear wheel F.

In FIG. 5c, the inclination of the bicycle with the user E at an angle δ relative to the road 50 can also be taken into account to orient the light sources.

According to the description provided hereinabove, a plurality of alternative embodiments of a portable active lighting device or of such a device installed on a bicycle having at least two wheels are possible while still remaining within the scope of the invention defined by the claims hereafter.

The invention claimed is:

1. A portable active lighting device, comprising:
   at least one power supply source;
   a first optical system with at least one first light source of variable intensity for long-distance illumination, said first light source being controlled by a control circuit connected to the power supply source;
   a second optical system with at least one second light source of variable intensity for short-distance illumination, said second light source being controlled by the control circuit connected to the power supply source;
   a light sensor configured to determine a light intensity of a location in which a vehicle with the lighting device is situated and to supply a measurement signal to the control circuit;
   a speed sensor configured to determine a speed of the vehicle on a path or road, and to supply a measurement signal to the control circuit; and
   the control circuit, which is configured to automatically activate the first optical system only when the determined speed of the vehicle exceeds a predetermined speed threshold, and determine a light intensity of the first source, when the first optical system is activated, based on a combination of both the light intensity determined by the light sensor and the speed determined by the speed sensor.

2. The device according to claim 1, wherein the control circuit is configured to automatically control lighting of the first and the second light sources.

3. The device according to claim 1, wherein a first drive means is provided for the first optical system and is configured to orient the light beam generated by the first light source.

4. The device according to claim 1, wherein a second drive means is provided for the second optical system and is configured to orient the light beam generated by the second light source.

5. The device according to claim 1, the device further comprising an orientation detector configured to supply an orientation signal to the control circuit in order to orient a light beam generated by at least one of the first light source of the first optical system and a light beam generated by the second light source of the second optical system, depending on a curve travelled by the vehicle on a path or road.

6. The device according to claim 3, wherein the first drive means is configured to directly orient the first light source.

7. The device according to claim 4, wherein the second drive means is configured to directly orient the second light source.

8. The device according to claim 1, wherein the control circuit is further configured to gradually control at least one of the light intensity of the first light source of the first optical system and a light intensity of the second light source of the second optical system in inverse proportion to an ambient light intensity detected by the light sensor.

9. The device according to claim 1, wherein the control circuit is further configured to control at least one of the light intensity of the first light source of the first optical system and a light intensity of the second light source of the second optical system in steps, relative to an ambient light intensity detected by the light sensor.

10. The device according to claim 1, wherein the control circuit is a microcontroller having a memory in which dates and times of day of a place in which the lighting device is situated are stored for functioning of the first and the second light sources from a certain time of day at a given date.

11. The device according to claim 1, wherein the vehicle is a bicycle and the speed sensor includes a GPS receiver or a magnetic sensor mounted on a fork of a wheel of the bicycle and is configured to detect a passage of a permanent magnet mounted on a spoke or on a rim of the wheel so as to determine the speed of the bicycle.

12. The device according to claim 5, wherein the orientation detector includes at least one of a magnetometer, an inclinometer, an accelerometer, a gyrometer, and a potentiometer.

13. The device according to claim 5, wherein the orientation detector is configured to be mounted on a support and to supply the orientation signal or an inclination signal by bidirectional wireless communication to the control circuit arranged on the vehicle with the first and the second optical systems to control an orientation of the first and the second light sources by a head movement of a user of the vehicle.

* * * * *